United States Patent [19]

Taylor

[11] Patent Number: 4,789,701

[45] Date of Patent: Dec. 6, 1988

[54] PLASTICS OR RUBBER MATERIALS MODIFIED BY CRYSTALLINE GLYCERATO-ZINC COMPLEX

[75] Inventor: Reginald M. Taylor, Hawthorn, Australia

[73] Assignee: Glyzinic Pharmaceuticals Limited, Perth, Australia

[21] Appl. No.: 61,345

[22] PCT Filed: Aug. 26, 1986

[86] PCT No.: PCT/AU86/00249

§ 371 Date: Apr. 23, 1987

§ 102(e) Date: Apr. 23, 1987

[87] PCT Pub. No.: WO87/01379

PCT Pub. Date: Mar. 12, 1987

[30] Foreign Application Priority Data

Aug. 27, 1985 [AU] Australia ............... PH2159

[51] Int. Cl.$^4$ ............................................. C08K 5/05
[52] U.S. Cl. ................................ 524/382; 524/381
[58] Field of Search ..................... ≧/381, 382, 925; 525/370; 556/130; 523/459, 511; 568/851

[56] References Cited

U.S. PATENT DOCUMENTS

| | | |
|---|---|---|
| 2,310,449 | 2/1943 | Lightbown et al. ............ 556/130 |
| 3,859,236 | 1/1975 | Blewett et al. ................. 524/381 |
| 4,090,773 | 5/1978 | Baue ............................... 252/300 |

FOREIGN PATENT DOCUMENTS

| | | |
|---|---|---|
| 78032/82 | 7/1982 | Australia . |
| 969555 | 6/1958 | Fed. Rep. of Germany . |
| 786300 | 2/1982 | U.S.S.R. . |
| 60228235 | 11/1985 | U.S.S.R. . |

OTHER PUBLICATIONS

Radolovich et al., Aust. J. Chem. 23 1967-71 (1970).
Hambley et al.-Aust. J. Chem. 36 1249-53 (1983).
CA 99:131605t (1983).
CA 101:192737u (1984).

*Primary Examiner*—Veronica P. Hoke
*Attorney, Agent, or Firm*—Cushman, Darby & Cushman

[57] ABSTRACT

The method of modifying an organic material including rubber and plastics which consists in the steps of embodying in the organic material during manufacture of the glycerato-zinc complex ($C_3H_6O_3Zn$) which is manufactured by heating a zinc compound and glycerol to a temperature below the boiling point of the glycerol to form crystals having substantial two-dimensional extension but low thickness and orientating the crystals selectively to improve tensile strength and reduce ultraviolet light degradation of the organic material.

11 Claims, 6 Drawing Sheets

PLASTICS OR RUBBER MATERIALS MODIFIED BY CRYSTALLINE GLYCERATO-ZINC COMPLEX

This invention relates to a method of and means for modifying rubber and plastics or other materials, particularly elastomeric materials, by use of polymers formed between metal oxides and glycerol at relatively high temperatures and which generally exhibit a greater two dimensional extension in one plane than in the extension in a plane normal thereto, and in particular it relates to the use of the high temperature compound formed between zinc oxide and glycerol which we have named "glyzinc" which was the subject of our earlier United Kingdom Pat. No. 2101132B which related to the use of a glycerato-zinc complex ($C_3H_6O_3Zn$) arranged and used as a pharmaceutical compound.

The glycerato-zinc complex produced according to our method produces platelets extending substantially in two directions in one plane and having low extension in a plane normal thereto which platelets can be grown to selected extensions in the one plane but retain a relatively low extension in the other plane and of a characteristic hexagonal form which have a high lubricity and can be aligned to lie in a selected plane.

During further research it has been found that the glycerato-zinc complex can be used beneficially in the production of plastics and rubber and particularly in elastomeric materials, and the object of the present invention is to provide certain improvements to such materials.

The use of zinc oxide in rubber is already well known and has been used since the early days of rubber compounding, the zinc additives principal function being to serve as a vulcanizing activator. It was generally known also that the rubber was improved by use of zinc oxide during the processing.

Reference may be had to U.S. Pat. No. 3,859,236 Charles Blewett et al which refers to the stabilization of Vinylchloride homopolymer and copolymers with very small percentages of zinc glyceroxide having the formula $C_3H_5O_3M_e$ where $M_3$ is the bivalent metal which constituted 40 to 50 percent by weight of their compound. There is no evidence that this produces or exhibits the controllable platelets of the present invention as defined in the above United Kingdom Patent, and is acknowledged as having a different formula. The Blewett substance appears to have been used merely as a substitute for zinc oxide and appears to contain free zinc oxide and be used for a different purpose.

In the British Patent referred to eariler herein it was shown that in addition to zinc oxide, any zinc compound, either soluble or insoluble in glycerol, which decomposes to zinc oxide on heating to a temperature below the boiling point of glycerol will on being subjected to continued heating in glycerol forms the glycerato-zinc polymer which is of two-dimensional extension and can be grown to have crystals of varying extensions in those directions. Thus it is possible by selective preparation to have relatively large thin crystals of 'glyzinc', or to have small crystals, or an admixture of these. Generally the larger platelike crystals exhibit an hexagonal morphology.

Basically the preparation of the material comprises mixing zinc oxide, or a zinc oxide forming material, with glycerol in the proportion of about fifty parts weight of zinc oxide, or zinc oxide forming material to an excess say 500 parts by weight of glycerol, raising the temperature of the mixture to about 260 degrees C. and maitaining the temperature with constant stirring until the action is complete, then coolig and pouring the mixture so formed into water, filtering, washing and drying to isolate the glycerato-zinc so formed. The reaction will proceed at lower temperatures more slowly.

During research it has been found that the platelets so formed can be incorporated in rubber as a substitute for zinc oxide whose function has herein been described or in plastic material and form an advantageous linkage in the final material the properties of which can be varied according to the method of processing. For instance the platelets of the compound can be arranged in the plastic or rubber in the same general orientation, but separated from each other, by bonding to the rubber or plastic material, and this alignment can be achieved by controlling the shear during extrusion or forming so that the two-dimensional platelets can be co-extensive and overlapping. This is a preferred orientation mode of incorporation.

It is, however, possible to mix the compound platelets with the plastic or rubber in such a way that random orientation of the 'glyzinc' platelets results depending on the nature of the final product which is required.

Unlike normal zinc oxide crystals therefore the present invention introduces into the organic materials, such as rubber or plastics, platelets of a selected dimension which can be relatively extensive in one plane but of low extension in a plane normal thereto.

The method of the invention thus consists in the steps of (a) embodying in the organic material during manufacturing of an ultraviolet shielding and bonding agent which consists of a glycerato-zinc complex comprising generally hexagonal platelets having substantial two dimensional extension in one plane but low extension in a plane normal thereto, and selectively arranging the platelets in the organic material.

The arrangement can comprise selected planar positioning or random orientation of the platelets.

The improved organic material has the platelets embodied therein during maufacture in a selected orientation which may be planar or of random orientation and when the organic material is in extended form such as a sheet or extended body may have the platelets selectively arranged in selected planes such as near one surface.

Because 'glyzinc' particles are in the nature of flat hexagonal form, with relatively large two-dimensional extension in one plane and small extension in a plane normal thereto, advantage can be taken of the capability of lining up the platelets during extrusion or forming to a sheet and as the surfaces of the platelets form linkage with the plastic or rubber material preferred orientation is possible and very thin sheets can be formed if required with high resistance to the permeation of ultraviolet rays as the glyzinc has been found to form a highly effective U.V. barrier and because the platelets can be built up in layers in the plastic or rubber not only as the strength of the rubber compound increased but the resistance to penetration by ultra-violet rays is similarly increased due to overlap of the platelets which as said may have relatively large extension, or can be a mixture of larger and smaller platelets but generally all with about the same thickness.

Research has indicated that the incorporation of glyzinc into plastics may provide some modifications of the physical properties at present achieved by other specific commercially available additives. This may be demonstrated by examples. The incorporation at the 3% level into polyethylene gave increased tensile strength, decreased elongation at break point, higher slip characteristics (lower coefficient of friction) and less discoloration than a similarly constituted polyethylene containing instead of glyzinc a currently used commercial UV stabiliser.

In polyvinyl chloride preparations the incorporation of glyzinc at the 2% level showed some heat protection against degradation and gave no visible changes after UV irradiation for 300 hours. It displayed increased tensile strength over a similarly constituted PVC containing 2% of a commercially available heat stabiliser.

Research suggests that "glyzinc" replacement for zinc oxide in rubber can give increased tensile strength and other advantageous effects for example the improved bonding with metals, and thus the rubber can be more effectively bonded to metal reinforcing or mesh in vehicle tyres.

To enable the general effects to be appreciated reference will be had to four graphs which form part of the specification which were made using in the first two figures a rubber sample and in the second two figures a sample using an epoxy resin.

FIG. 1 shows the X-ray diffraction pattern of a rubber sample containing glyzinc the characteristic X-ray diffraction basal reflections, the (100), (300) and (400), and the absence of general (hkl) reflections indicate that the glyzinc platelets are highly oriented in the rubber and are paralleled with the rubber surface, showing that although bonded with the rubber the glyzinc has not been degraded or changed. Extruded polyethylene film displays the same pattern of oriented glyzinc platelets.

Figure 1:
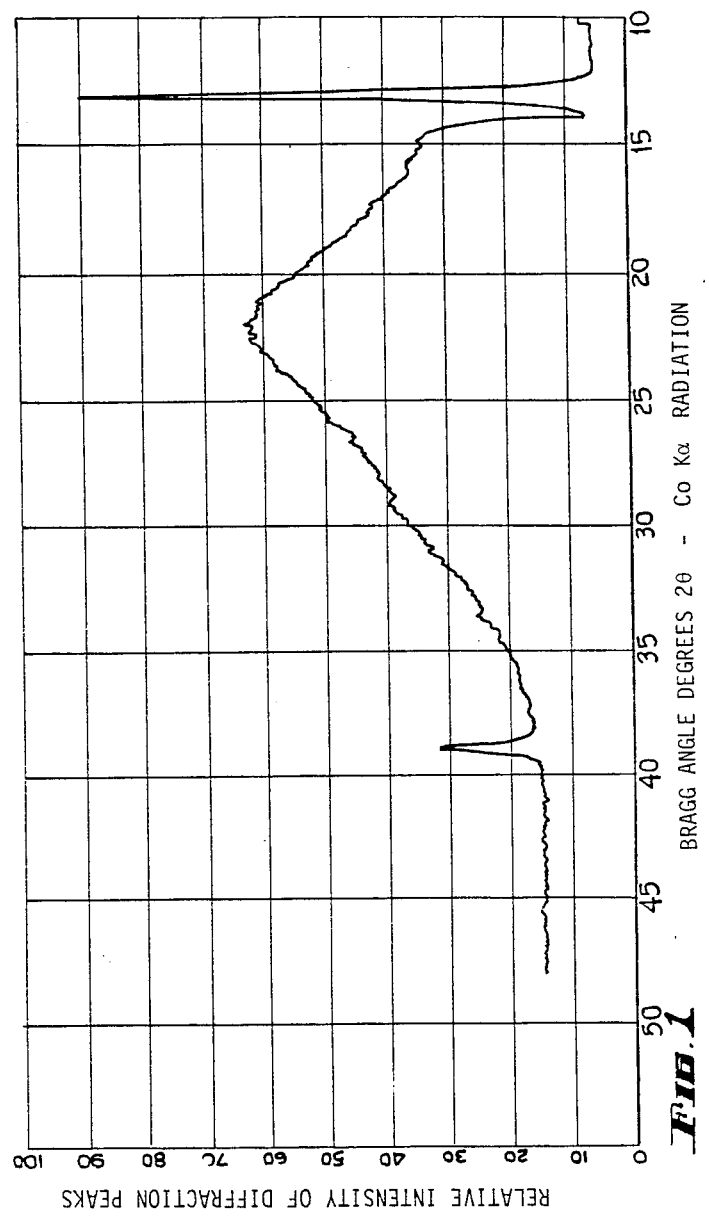
Figure 2:
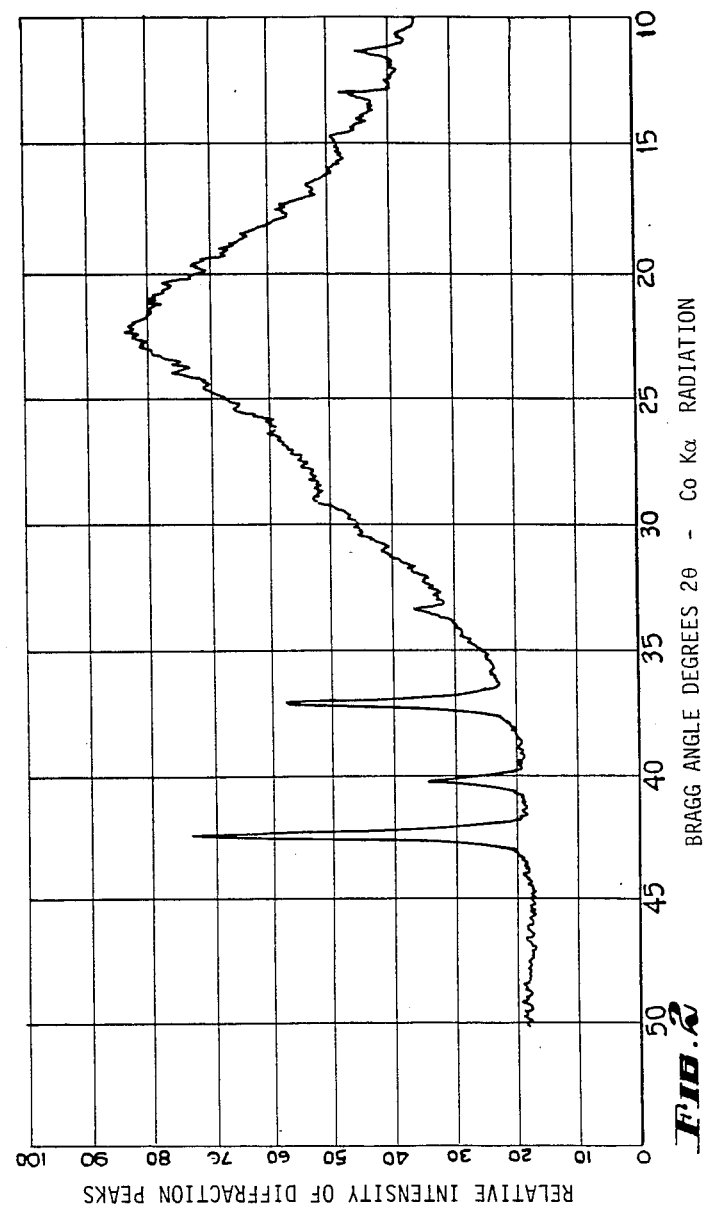
FIG. 2 is the resulting similar X-ray diffraction pattern exhibited when the rubber contains zinc oxide in place of the glyzinc.
Figure 3:
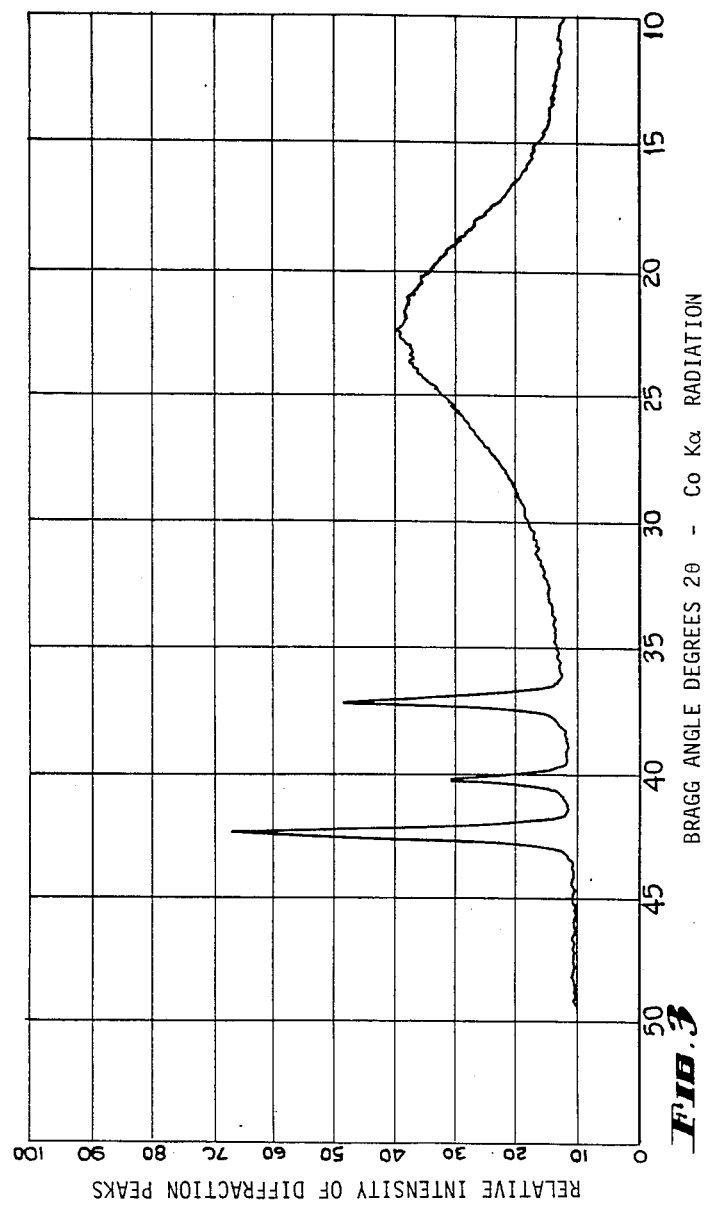
FIG. 3 is a similar diffraction pattern of an epoxy resin with zinc oxide showing the diagnostic X-ray diffraction lines of the zinc oxide.
Figure 4:
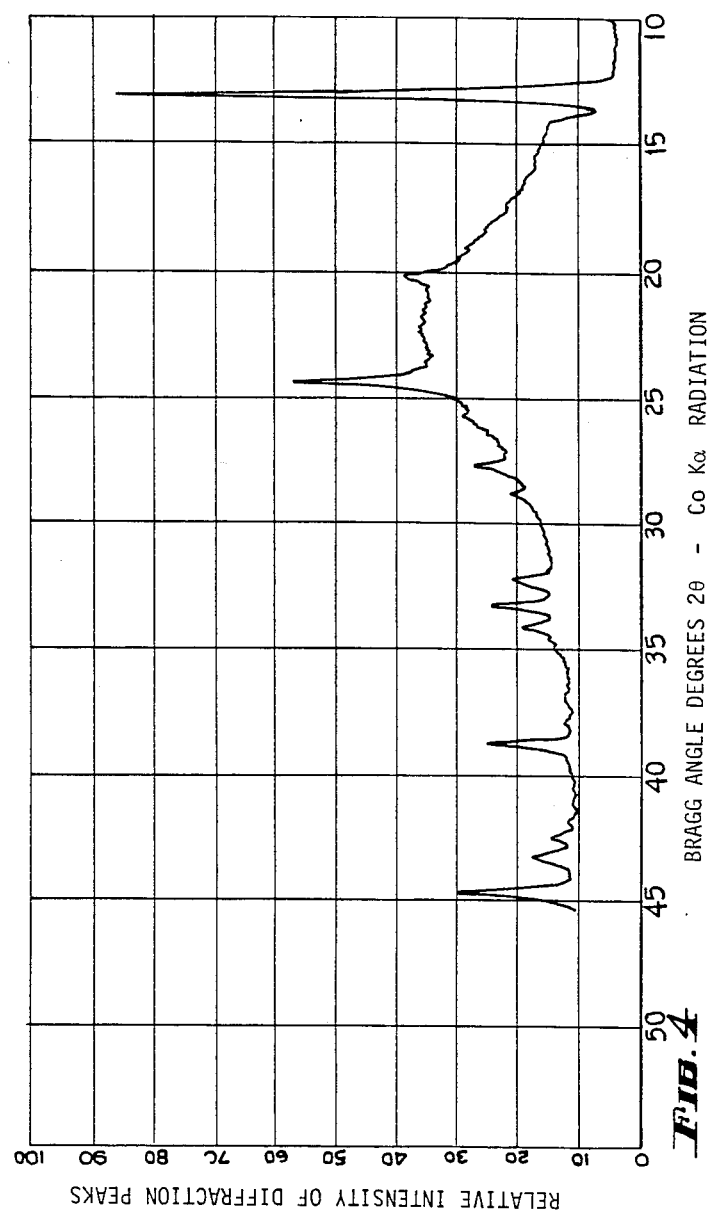
FIG. 4 shows the glyzinc in an epoxy resin but in this case unlike in the rubber sample which was produced as a sheet by extrusion or the polyethylene film, the polymer was added to a viscous plastic and the presence of other than basal reflections show that there is no real preferred orientation of the glyzinc platelets in that form.
Figure 5:
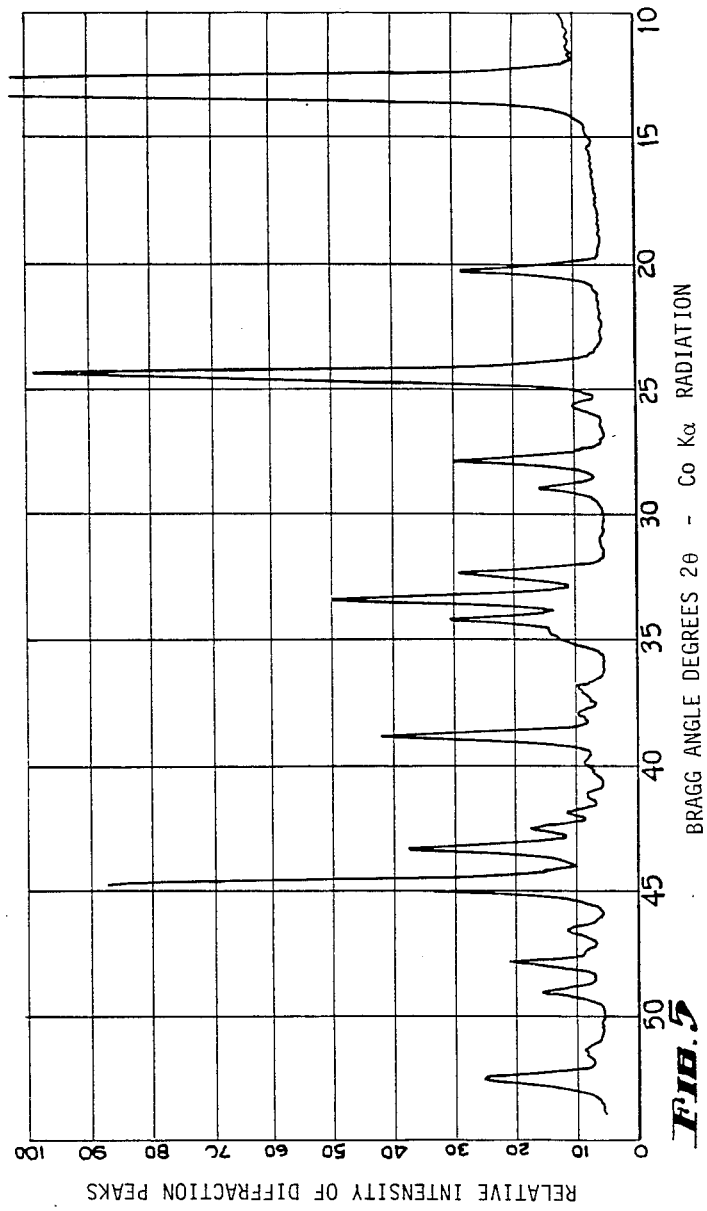
FIG. 5 is a graph showing the complete X-ray diffraction pattern for glyzinc within the angular range examined.
Figure 6:
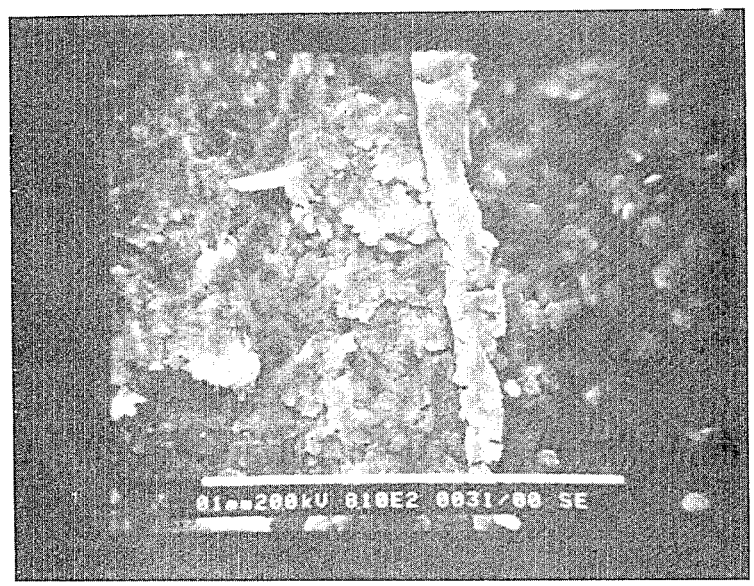
FIG. 6 is an electron microscope photograph of a surface formed by reinforcing a layer of PVC with glyzinc platelets, the surface on the left of the photograph being the surface which has been cut.
Figure 7:
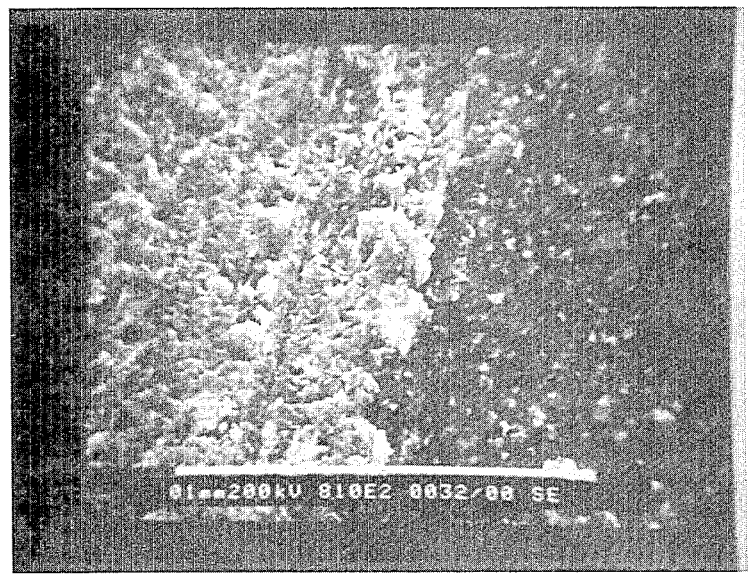
FIG. 7 is a similar electron microscope photograph in which zinc oxide replaces the glyzinc.

From the foregoing it will be realized that the glyzinc bonds effectively with rubber or plastic and because of the nature of the platelets of the glyzinc an oriented disposition of the glyzinc particles is possible according to the method of manufacture or if required random orientation is also possible according to the stresses involved in the formation of the product. It will be appreciated that because of the large surface area of two-dimensional glyzinc and effective bonding with the base material and with metal, improved rubber and plastics are possible.

During original observation for the same weight of ZnO and glyzinc incorporated into physically identical rubber strips there was a lower extension per unit weight for the glyzinc rubber than for the one containing ZnO. This greater tensile strength applied at room as well as elevated temperatures and the presence of the diagnostic X-ray diffraction peak of glyzinc in the rubber indicated that the presence of this polymer changes some of the physical properties of the rubber.

To determine the general effects of glyzinc when used with a polymer, two rubber samples studied contained 5% ZnO and glyzinc and their powder diffraction patterns each established a broad diffraction band at 4.7 Å due to the polymeric chains of the rubber, indicating that the fillers ZnO and glyzinc cause no significant change in the polymeric structure. In addition to the broad band the respective traces show different diffraction signals due to the filler components.

The elastic properties of rubber samples were tested for expansion at both room temperature (14° C.) and 105° C. The samples were tested under the same conditions : 80 mm of each rubber was subjected to a 900 gm force at the respective temperatures and the expansion recorded.

At room temperature the ZnO-rubber stretched by 17% while at 105° C. it stretched to a total of 20%.

In contrast, the glyzinc-rubber only stretched by 11% and 15% respectively. In each case the rubber samples contracted to the original length on removal of both the weight and heat.

In addition to rubber, araldite samples were studied using (1) pure araldite, (2) ARALDITE (Trademark) with 10% ZnO filler, and (3) ARALDITE with glyzinc. The relative molar ratio for samples for the latter two, (2) and (3) is given by: ZnO:glyzinc=1:1.

Each trace exhibited the characteristic broad band at 4.6 Å, signifying that the filler components cause no significant change in the ARALDITE's polymeric structure.

PERSPEX (Trademark) samples were studied, using (1) pure PERSPEX, (2) PERSPEX with 10% (W/W) ZnO, (3) PERSPEX with glyzinc (ZnO:glyzinc=1:1), and (4) PERSPEX with 30% (W/W) ZnO.

The XRD traces for this series of polymers show differences in the broad band position. The bands for the samples 1, 2 and 3 were found to be at 5.95, 5.56 and 5.71 Å, respectively. These values are significantly different and suggest changes in the polymer backbone as a result of interaction with the fillers. Comparing the traces shows that changing the ZnO content from 10% to 30% has no further effect on the broad band signal.

As observed with the other plastic polymer samples the above traces also show the characteristic ZnO and glyzinc "fingerprint" diffraction patterns.

It will be realized that various levels of glyzinc can be incorporated into the rubber or plastic compound so that the desired physical properties can be obtained and optimised by the known level of glyzinc addition.

It is of interest to note that when added to rubber or plastic the added glyzinc retained its separate chemical identity under the temperatures and conditions used in the formation of the various products.

Because of the non-irridant and non-toxic nature of glyzinc and its normal decomposition products, advantages may be gained in replacing some of the chemical stabilisers presently used in plastic manufacture by the glyzinc polymers and still retain the advantages offered by these chemical additives.

The claims defining the invention are as follows:

I claim:

1. A method of modifying an organic material selected from diene rubber and plastic comprising the steps of (a) embodying in said organic material, during manufacture thereof, an ultraviolet light ray shielding and bonding agent comprising a glycerato-zinc complex ($C_3H_6O_3Zn$) prepared by heating a zinc compound and glycerol to a temperature below the boiling point of said glycerol and continuing said heating to form crystals of generally hexagonal morphology having substantial two-dimensional extension but low thickness and (b) selectively arranging the crystals of said glycerto-zinc complex in said organic material, whereby to improve tensile strength of thus modified organic material and to reduce deterioration of said organic material by light in the ultraviolet wave length.

2. The method of claim 1 including orienting said glycerato-zinc crystals to produce a laminar arrangement of the crystals.

3. The method of claim 2 which includes subjecting said organic material to shear during manufacture thereof and applying said glycerato-zinc crystals to said organic material prior to applying said shear.

4. The method of claim 2 which includes introducing said glycerato-zinc crystals into said organic materials during formation thereof whereby said glycerato-zinc crystals are arranged in random orientation.

5. An organic material selected from diene rubber and plastic having included therein platelets or glycerato-zinc complex ($C_3H_6O_3Zn$) prepared by heating a zinc compound and glycerol and continuing said heating to form platelets of a generally hexagonal morphology having substantial two-dimensional extension in one plane but low extension in a plane normal thereto, said complex being present in an amount sufficient to improve the tensile strength of said organic material and to reduce deterioration of said organic material by light in the ultraviolet wavelength.

6. The organic material of claim 5 wherein said organic material is diene rubber and said glycerato-zinc complex forms from two to ten percent by weight of the final rubber complex.

7. The organic material of claim 5 wherein said organic material is a plastic and said glycerato-zinc complex forms from two to ten percent by weight of the final plastic complex.

8. The organic material of claim 5 wherein said platelets of the glycerato-zinc complex are aligned to have their two-dimensional extension in substantially parallel planes so as to form an overlap of the said platelets.

9. The organic material of claim 8 wherein said organic material is in extended form and said platelets are aligned to be substantially parallel to the direction of extension of said organic material.

10. The organic material of claim 8 wherein said organic material is in extended form and said platelets are arranged to lie at least near one surface of said organic material.

11. The organic material of claim 5 wherein said platelets of the glycerato-zinc complex are arranged at random orientation.

* * * * *